Nov. 9, 1937.   J. TYKOCINSKI-TYKOCINER   2,098,364
METHOD OF AND MEANS FOR TRANSMITTING, RECORDING, AND REPRODUCING SOUND
Filed May 11, 1929
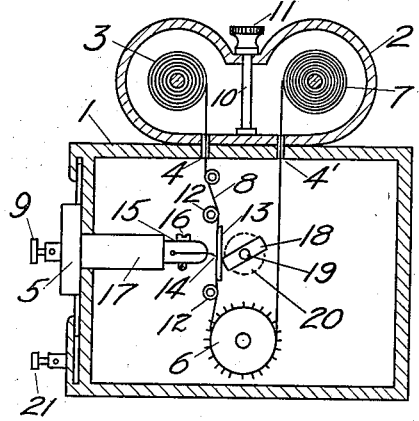
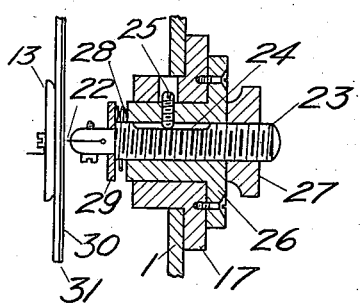
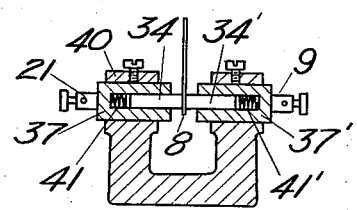
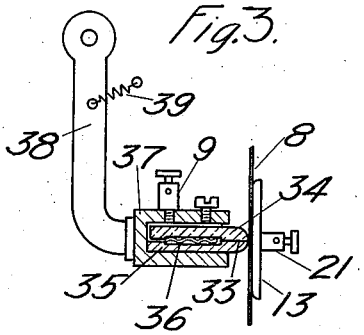
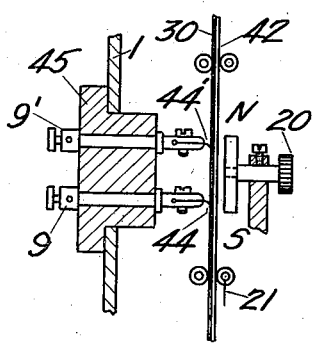
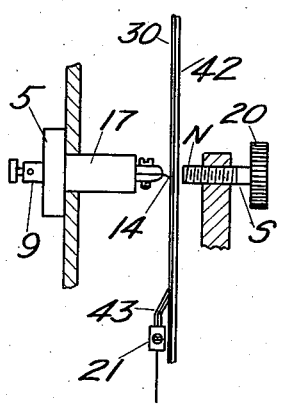
Inventor
Joseph Tykocinski-Tykociner.

Patented Nov. 9, 1937

2,098,364

UNITED STATES PATENT OFFICE 2,098,364

METHOD OF AND MEANS FOR TRANSMITTING, RECORDING, AND REPRODUCING SOUND

Joseph Tykocinski-Tykociner, Urbana, Ill.

Application May 11, 1929, Serial No. 362,446

8 Claims. (Cl. 179—100.3)

In my patent specification No. 1,640,557 issued August 30, 1927 and No. 1,590,399 issued June 29, 1926, I have described certain methods and apparatus in connection with transmitting, recording and reproducing of sound.

My present application discloses certain specific improvements and refinements of the methods and apparatus which relate to the same subject matter as my prior inventions. Among other things this application discloses improvements as follows: first improvements in the recording mechanism to make the recording of sound or variations of audio-frequency or radio-frequency currents still more simple and accurate; second, improvements in the sensitive film to be used for recording and third, improvements in the means for reproducing sound from photographic records and in preparing of copies from original records.

Since these improvements all relate to the general subject matter of transmitting recording and reproducing sound, I shall describe the same in connection with each other and in connection with the system of my prior specification so that those skilled in the art will be able to construct and operate the best form of the invention.

Whereas the improvements which are herein disclosed and claimed are particularly useful in connection with the matter of transmitting, recording and reproducing sound it is to be understood that the invention is not to be limited to employment in connection with sound, but any phenomenon in which the invention or any part of the same may be useful.

Whereas I have enumerated above certain specific improvements it will be apparent as the following description proceeds, and as the drawing is examined, that there are numerous other incidental improvements which are not to be lost sight of, but which I intend to claim as a part of my invention.

In the accompanying drawing which forms a part of the present specification:

Fig. 1 illustrates a vertical longitudinal section of a recording device for recording variations of current upon a photographic film by means of variations of light produced by the discharge at the edge of a thin metallic tape.

Fig. 2 is a longitudinal section through a modified form of an adjustable recording electrode.

Fig. 3 is a similar section through a modification in which the thin metallic recording electrode is deposited in form of a film between two insulating plates.

Fig. 4 illustrates a cross-section of a combination of a pair of recording electrodes separated by an interposed photographic film.

Fig. 5 illustrates a longitudinal section through the recording device supplied with means for magnetic regulation of the pressure exerted by the electrode upon the sensitive film, the latter having for its base a thin metallic foil.

Fig. 6 illustrates a longitudinal section through a modification of the recording device supplied with an additional element for preexposing the sensitive film.

Referring now to Figs. 1 to 6 inclusive I have shown means for securing actinic discharges which may be varied in accordance with telegrahic, telephonic or radio currents by a discharge between electrodes separated by a light-sensitive film. These electrodes with the minute gap interposed at the surface of the sensitive film provide a clear sharp line of light which is high in actinic properties and I place the edges of the electrode directly in contact with the film upon which the record is to be made. Thus the sensitive film is exposed not only to the impinging radiations of visible and unvisible electromagnetic waves emitted by the discharge, but also to the action of concentrated electric flux, to the bombardment of charged corpuscles moving towards the film in the direction of the electric flux and to chemical reactions of the products formed by the discharge.

While I shall describe the recording electrodes as in contact with the film, it is to be understood that the contact is not necessary for any reason other than to secure as close proximity between the source of actinic activity and the recording film or plate as possible.

In Fig. 1 I have shown an improved form of recording camera which comprises a light tight box 1 provided with a suitable magazine 2 for feeding a roll of film 3 through a slot 4 in the magazine and in the box 1 past a suitable generator 5 of actinic activity over the feeding drum 6 and back through a slot 4' into a receiving roll 7 in the magazine 2. The magazine 2 is adapted to be secured on top of the box 1 by means of a removable connection such as indicated by the stud 10 and knurled nut 11. Within the box 1, I provide a pair of rollers 12 on one side of the film 8 and a guiding metal plate 13 made of nonmagnetic material on the other side of the film. The recording device 5 shown in Fig. 1 comprises a thin flexible tape preferably of stainless steel 14 clamped in a slot of a metal holder 15. The latter carries a clamping screw 16 and is mounted in an insulating bushing 17. Behind the guiding plate 13 a magnet 18, set on a spindle 19 extending outside the back wall of the box 1, can be rotated by means of a handle 20 indicated by a dotted circle. The magnetic lines of this magnet concentrate on the tape 14 and cause it to press against the film 8. The pressure may be adjusted by varying the distance of the magnetic poles from the edge of the tape 14. The guiding plate 13 is electrically connected to the box which carries a binding post 21.

When the binding posts 9 and 21 are connected to a source of potential of about 500 volts an actinic discharge sets in in the minute air gap embedded between the latter and the guiding plate 13. The action is partly similar to that described in my patent specification No. 1,649,557 pp. 2-3. The improvement consists in still more concentrating the discharge and in using the sensitive film 8 as a poor conductor inserted between the two electrodes, so that all the properties of the discharge may be fully utilized.

Besides the actinic action of the radiations I make use if desired of the following effects. The local application of heat, the electric polarization of the sensitive film by subjecting it to a steady electric flux upon which variations of potential are superimposed, the impact of ions and electrons and the formation of chemical products as for instance ozone. Furthermore by using for the discharge electrode the edge of a thin tape, the capacity of the electrode is considerably reduced and the voltage as well as the current required for an efficient discharge is diminished. The small capacity of the electrodes enables the use of modulated high frequency potentials more efficiently than with my previous devices.

My invention is not limited by the forms of electrodes 13 and 14 as shown in Fig. 1 on both sides of the photosensitive film 8. A variety of forms give the described effect. So for instance one or both of said electrodes can be made in form of a roller pressed against the film by means of springs.

The following figures illustrate other examples of the different forms of how the underlying idea of my invention is realized.

Fig. 2 illustrates a form of the recording device in which the electrode 22 concentrating the discharge consists of a sharp edged blade of metal or mineral set in a slit cut in one end of a micrometer screw 23. The latter has a groove 24 and is prevented from rotation by a guiding screw 25. By rotating the nut 27 the micrometer screw 23 can be shifted along its axis inside the bushing 26. A spring 28 interposed between the face of the bushing 26 and the nut 29 prevents lost motion of the screw 23. The sharp edge of the blade 22 facing the emulsion side 30 of the film 31 may be thus adjusted to leave a minute distance just enough to prevent scratching the emulsion. The bushing 26 is fixed to the insulating holder 17 and the latter attached to the wall 1 of the recording camera. The width of the recording electrode 22 as well as that of the tape 14 of Fig. 1 is chosen to correspond to the desired width of the record. In most cases it will be made narrower than the width of the sensitive film; in other cases it may be reduced to a sharp point.

As the ultimate object of the invention is to produce a true and clear record of variations of actinic discharges at the surface of a sensitive film the thickness of the recording electrode must be made as small as possible. There is however a limit to the thickness of drawn metal. Tapes drawn below 0.5 mil. in thickness loose the stiffness required to insure a rigid straight line position on the surface of the film.

Fig. 3 illustrates a recording electrode whose thickness can be reduced to molecular dimensions. A fine film of platinum 33 or any suitable conductive material deposited upon the surface of an insulating plate 34 and protected by a similar plate 35 serves this purpose. Between these plates a corrugated contact spring 36 is placed to insure connection with the source of sound-modulated electric potential.

In Figs. 1 to 3 plates 13 are shown at the back of a sensitive film serving as the second electrode connected to the source of variable potential. In Fig. 4 it is shown how two similar recording electrodes 34 and 34' can be used on each side of the film 8 one of them replacing the plate 13. The recording electrodes 34 and 34' are set in the holders 37, 37', which are fixed in a V-shaped mounting 40. Springs 41, 41' secure the proper pressure of the electrodes upon the film 8 moving perpendicularly to the surface of the drawing. Binding posts 9 and 21 serve to connect the electrodes to the source of modulated potential. This arrangement provides a more refined means of concentrating the actinic discharges directly in the sensitive emulsion. Experiments have shown that the application of modulated high frequency potentials makes it possible to use in many cases a single electrode.

The character of the discharges produced in the gap at the surface of the poor conductor depends on the pressure and properties of the gas surrounding the electrode. If it is desired the air in the recording camera can be replaced by carbon dioxide nitrogen helium or any other pure or mixed gases in accordance with the particular spectral property required. The pressure of the gas in the recording compartment may be also varied to adapt it to the voltage at which the recording is most effective.

The film shown in Figs. 1 to 4 consists of a sensitive photographic emulsion 30 adhering to a celluloid base 31. The latter being a poor conductor causes a slight straying of the electric flux originating from the recording electrode, passing through the emulsion and celluloid base and ending at the other electrode 13. This straying effect is greatly reduced by providing a conductive base for the emulsion. Fig. 5 illustrates this device. The emulsion 30 is here carried by a ribbon 42 of greater conductivity than that of the usual Celluloid. The material of the ribbon may be Celluloid impregnated with conductive chemicals or any other suitable conductive film. The most suitable material is a thin flexible metallic foil made of aluminum bronze or any other ductible pure metal or alloy. A contact brush 43 is used for connecting the foil 42 to the source of varying potential. In this arrangement the role of the plate 13 in Figs. 1 to 3 as a second electrode is taken over by the conductive base 41 of the film. Instead of the brush 43 a pair of contact rollers may be used or the conductive base may be directly grounded to the body of the camera at the guiding elements of the film or at the ends of the film through the spindle on which the film is rolled on or rolled off. It is evident that with this arrangement the entire potential difference between the recording electrode 14 and the foil 42 is active in the thin layer of the sensitive emulsion and causes a highly concentrated actinic discharge along a sharply defined line formed by the contact of the recording electrode 14. The latter is pressed against the emulsion by means of an adjustable magnetized screw N—S supplied with a handle 20.

Fig. 6 illustrates a modification of the recording device in which beside the recording element 44 another similar element 44' is mounted in a common insulating bushing 45. This second element 44' is connected to a constant source of potential in order to produce a discharge of small but fixed intensity preparing an even and slightly exposed track for the following record. This improvement is useful in reducing the distortion due to the photographic inertia of the sensitive film. Thus the straight line photographic characteristic of the emulsion is made use of for the operation of the modulated actinic discharges. The magnet N—S can be shifted by means of a knob 20 and thus regulates the pressure of the electrodes 44 as well as that of 44'.

I wish to call attention to the fact that all the devices and improvements above described and illustrated in Figs. 1 to 6 can be used not only for recording but also for the reproduction of sound if the variations of dielectric properties of the record are made use of. My patent specification No. 1,590,399 issued June 29, 1926 contains a description of this method. For this purpose the direct current or high frequency voltage applied to the electrodes shall preferably be adjusted below the critical potential at which the discharge sets in.

It will now be apparent from the above specification and drawing that I have made certain improvements in the apparatus employed in the complete system of my prior applications above referred to, and I have not shown these individual elements as assembled into a complete sound and picture recording or reproducing or transmitting system since it will be apparent from my prior applications how the individual elements of the present application are to be employed or may be employed. I do not wish, however, to limit the use of the individual elements which I have disclosed and described to use in only the particular situation prescribed by my prior applications but intend that they may be used generally wherever found suitable for employment.

I claim:—

1. In combination, a photo-sensitive film, a source of actinic effect comprising a minute gas film, an electrode defining said gas film, another electrode guiding the motion of the photosensitive film, both electrodes being maintained substantially in contact with said film, means for pressing said electrodes against the sensitive film and means for impressing sound controlled variations of potential upon said electrodes for varying the intensity of the discharge.

2. In combination, a plurality of elements in physical contact with each other consisting of a poor conductor in form of a sound recording film moving between two electrodes one of said electrodes ending with a sharp edge, the other having a relatively larger surface means for adjusting the pressure and position of said sharp electrodes in relation to said poor conductor and means for creating sound controlled discharges of high actinic value at the surface of the poor conductor facing said sharp electrode.

3. In combination, a plurality of elements in physical contact with each other consisting of a poor conductor in form of a photosensitive film moving between two electrodes means for adjusting the pressure and position of one of said electrodes in relation of said poor conductor and means for creating sound controlled discharges of high actinic value in the minute gaps separating said electrodes from said poor conductor.

4. In combination, a plurality of elements in physical contact with each other consisting of a recording film moving between a plurality of electrodes, means for adjusting the pressure and position of said electrodes in relation to said film and means for creating a discharge of constant actinic value at one set of electrodes and a sound controlled discharge of variable actinic values at another set of electrodes.

5. In combination, a plurality of elements, consisting of a poor conductor in form of a photosensitive film attached to a relatively good conductor, both conductors moving jointly, a discharge electrode in physical contact with said poor conductor and means for conducting said electrode and said good conductor to a source of potential for producing sound controlled discharges of high actinic value in a gas film separating said electrodes from said poor conductor.

6. In a recording system for recording on a photo-sensitive element, the combination of; a primary electrode positioned close to said photo-sensitive element and formed of a high-resistance material; a current source for sending a current through said primary electrode in a direction across said photo-sensitive element whereby a voltage drop takes place across said primary electrode; and a secondary electrode means positioned on the opposite of said photo-sensitive element from said electrode and electrically connected to said current source, said current source developing sufficient potential to expose said photo-sensitive element.

7. A method of recording sound which consists in passing a sound modulated electric current from one point to another point, uniformly moving a photosensitive surface transversely between said points in order that said modulated electric current shall pass directly and completely through said photosensitive surface in order to chemically alter the substance of said surface in accordance with sound waves to obtain a developable latent sound record.

8. In combination, means for converting sound waves into sound modulated electric current, a pair of contact elements connected to said converting means to receive said sound modulated current, and a movable photosensitive surface placed between and in direct contact with one of said contact elements to be chemically altered thereby to produce a developable latent sound record by the action of said current upon said photosensitive surface.

JOSEPH TYKOCINSKI-TYKOCINER.